United States Patent
Duan et al.

(10) Patent No.: US 10,240,999 B2
(45) Date of Patent: *Mar. 26, 2019

(54) METHOD AND APPARATUS OF ESTIMATING WAVE VELOCITY OF NEGATIVE PRESSURE WAVE IN A FLUID TRANSPORTATION PIPELINE

(71) Applicant: International Business Machines Corporation, Armonk, NY (US)

(72) Inventors: Ning Duan, Beijing (CN); Jin Huang, Shanghai (CN); Juhnyoung Lee, Yorktown Heights, NY (US); Chunhua Tian, Beijing (CN); Junchi Yan, Shanghai (CN); Yu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/279,900

(22) Filed: Sep. 29, 2016

(65) Prior Publication Data

US 2017/0082518 A1    Mar. 23, 2017

Related U.S. Application Data

(63) Continuation of application No. 14/050,698, filed on Oct. 10, 2013, now Pat. No. 9,534,979.

(30) Foreign Application Priority Data

Nov. 16, 2012  (CN) .......................... 2012 1 0465977

(51) Int. Cl.
  *G01M 3/28*    (2006.01)
(52) U.S. Cl.
  CPC ............................... *G01M 3/2815* (2013.01)
(58) Field of Classification Search
  CPC .......... F17D 5/00; F17D 5/06; G01M 3/2815; G01M 3/243; G01M 3/2807; G01F 9/006; H04Q 2209/753; H04Q 9/00

USPC ........ 702/47, 50, 51, 191; 73/49.1; 340/603, 340/605
See application file for complete search history.

(56) References Cited

U.S. PATENT DOCUMENTS

| | | | |
|---|---|---|---|
| 6,389,881 B1 | 5/2002 | Yang et al. | |
| 9,534,979 B2* | 1/2017 | Duan | ............... G01M 3/2815 |
| 2011/0093220 A1 | 4/2011 | Yang et al. | |
| 2011/0184670 A1 | 7/2011 | Wang et al. | |

(Continued)

FOREIGN PATENT DOCUMENTS

| | | |
|---|---|---|
| CN | 1321846 A | 11/2001 |
| CN | 1322914 A | 11/2001 |
| CN | 101968162 A | 2/2011 |
| CN | 202252871 U | 5/2012 |

(Continued)

OTHER PUBLICATIONS

Liu Zhan-Liang, "Research on Leakage Localization Gordian Technology for Long Distance Crude Oil Pipleine", Master's Thesis submitted to China University of Petroleum, Apr. 2007, China University of Petroleum, Beijing, CN.

(Continued)

*Primary Examiner* — John H Le
(74) *Attorney, Agent, or Firm* — Scully, Scott, Murphy & Presser, P.C.; Rabin Bhattacharya

(57) ABSTRACT

A method and apparatus for estimating a wave velocity of negative pressure wave in a fluid transportation pipeline. The method including: receiving a plurality of pressure signals from a plurality of sensors; determining time differences produced by the negative pressure wave reaching the adjacent sensors based on the received pressure signals; determining a wave source sensor segment where a wave source of the negative pressure wave is located; and estimating the wave velocities of the negative pressure wave in a non-wave source sensor segment and the wave source sensor segment.

20 Claims, 6 Drawing Sheets

(56) References Cited

U.S. PATENT DOCUMENTS

2012/0007743 A1    1/2012    Solomon
2012/0007744 A1    1/2012    Pal et al.

FOREIGN PATENT DOCUMENTS

| | | |
|---|---|---|
| CN | 102588745 A1 | 7/2012 |
| CN | 202074237 U | 12/2012 |
| RU | 2421657 C1 | 6/2011 |
| UA | 63085 A | 1/2004 |

OTHER PUBLICATIONS

Tian, C., et al., "Negative Pressure Wave Based Pipeline Leak Detection: Challenges and Algorithms", 2012 IEEE International Conference on Service Operations and Logistics, Informatics (SOLI), Jul. 8-10, 2012, Suzhou, China, pp. 372-376, available at <URL: http://ieeexplore.ieee.org/stamp/stamp_jsp?arnumber=6273565>.

Technology and Mechatronics Automation, 2009, Apr. 11-12, 2009, Zhangjiajie, China, pp. 360-363, available at <URL: http://ieeexplore.ieee.org/stamp/stamp.jsp?arnumber=520.

Lee, P., et al., "Leak Location in Single Pipelines using Transient Reflections", Australian journal of Water Resources, vol. 11, No. 1, 2007, pp. 53-66.

de Frebbo, M., et al., "ILDS—An Innovative Approach for Pipeline Leak Detection", 6th Pipleline Technology Conference 2011, pp. 1-2.

<URL: http://www.asel-tech.com.br/_documentos/Asel-Tech-ILDS-Technical-Informations.pdf>.

Shuqing, et al., "Study on New Methods of Improving the Accuracy of Leak Detection and Location of natural Gas Pipleline", ICMTMA '09, International Conference on Measuring, Apr. 11-12, 2009.

\* cited by examiner

METHOD AND APPARATUS OF ESTIMATING WAVE VELOCITY OF NEGATIVE PRESSURE WAVE IN A FLUID TRANSPORTATION PIPELINE

CROSS-REFERENCE TO RELATED APPLICATION

This application is a continuation of U.S. patent application Ser. No. 14/050,698, filed Oct. 10, 2013, the entire content and disclosure of which is incorporated herein by reference.

This application claims priority under 35 U.S.C. § 119 from Chinese Patent Application No. 201210465977.1 filed Nov. 16, 2012, the entire contents of which are incorporated herein by reference.

FIELD OF THE INVENTION

The present invention relates to leak detection and locating in a fluid transportation pipeline, and more particularly, to a method and apparatus for estimating a wave velocity of negative pressure wave in a fluid transportation pipeline.

DESCRIPTION OF THE RELATED ART

Leak detection and locating is an important method in fluid transportation pipeline management. The existing methods for pipeline leak detection and locating include acoustic pressure wave (negative pressure wave) detection and locating method, balancing method, statistical method, real time transient model (RTTM) method etc., wherein the acoustic pressure wave detection and locating method is the most commonly used method due to its low cost, high leak detection performance and relatively low false alarm.

In the acoustic pressure wave detection and locating method, multiple sensors are installed at different locations of the fluid transportation pipeline to continuously detect pressure of the acoustic pressure wave. When a leak occurs, the sensors will detect a sudden decline in pressure that is propagated along the fluid transportation pipeline from the leak location both upstream and downstream. Thus, the leakage at the fluid transportation pipeline can be detected by detecting the decline in pressure of acoustic pressure wave.

FIG. 2 is a diagram illustrating the existing acoustic pressure wave detection and locating method. As shown in FIG. 2, six sensors S1-S6 are installed on the fluid transportation pipeline. Assume that a leak occurs between sensors S3 and S4, the acoustic pressure wave caused by the leakage propagates both upstream and downstream. Assume that upstream sensor S2 detects the acoustic pressure wave at time t1, and downstream sensor S5 detects the acoustic pressure wave at time t2. Assume that the distance between the leak location and upstream sensor S2 is $d_1$, and the distance between the leak location and downstream sensor S5 is $d_2$, then the leak location $D_{leak}$ can be calculated by the following equation (1):

$$D_{leak} = \frac{V(t_1 - t_2) + d_1 + d_2}{2} \quad (1)$$

wherein V is a propagation rate of the acoustic pressure wave (also referred to as a wave velocity). Therefore, the accurate wave velocity V needs to be acquired to be able to accurately locate the leak position.

Two existing methods for estimating the wave velocity are sound hammer simulation method and empirical equation method.

In the sound hammer simulation method, a sound hammer is used as a wave source of acoustic pressure wave to generate the acoustic pressure wave to propagate towards the sensors. In the case that the distances between the wave source and the sensors are known, the wave velocity can be calculated by measuring the time differences between the time of generating the acoustic pressure wave and the time when the sensors detect the acoustic pressure wave. However, the sound hammer simulation method is an offline simulation method, which cannot reflect the value of wave velocity when the leak actually occurs, because the wave velocity is subject to environmental factors such as a type of fluid (e.g., crude oil, diesel oil etc.), a fluid temperature, a leak location, topology of fluid transportation pipeline, and so on. In addition, measurement process of the sound hammer simulation method needs extra cost.

In the empirical equation method, the wave velocity of the acoustic pressure wave is considered to be related to liquid volume elastic coefficient, liquid density, modulus of elasticity, pipe diameter, pipe thickness, and flow speed of fluid etc. By acquiring values of these related parameters when a leak occurs, the wave velocity of the acoustic pressure wave can be calculated with an empirical equation. However, it is actually not easy to acquire the accurate values of relevant parameters required by the empirical equation method, and the empirical equation itself possesses inaccuracy.

Therefore, a method that is capable of estimating the wave velocity of acoustic pressure wave more accurately is required, which can accurately estimate the wave velocity even if the wave velocity is subject to the environmental factors.

SUMMARY OF THE INVENTION

According to one aspect of the present invention, there is provided a method for estimating a wave velocity of negative pressure wave in a fluid transportation pipeline, wherein the negative pressure wave is generated due to a normal operation on the fluid transportation pipeline. The method includes: receiving a plurality of pressure signals from a plurality of sensors; determining a location of a wave source of the negative pressure wave; determining time differences produced by the negative pressure wave reaching the adjacent sensors based on the plurality of pressure signals; and estimating the wave velocities of the negative pressure wave in sensor segments.

According to another aspect of the present invention, there is provided a method for estimating a wave velocity of negative pressure wave in a fluid transportation pipeline, wherein the negative pressure wave is generated due to leakage at the fluid transportation pipeline. The method includes: receiving a plurality of pressure signals from a plurality of sensors; determining time differences produced by the negative pressure wave reaching the adjacent sensors based on the received pressure signals; determining a wave source sensor segment where a wave source of the negative pressure wave is located; and estimating the wave velocities of the negative pressure wave in a non-wave source sensor segment and the wave source sensor segment.

According to still another aspect of the present invention, there is provided an apparatus for estimating a wave velocity of negative pressure wave in a fluid transportation pipeline, wherein the negative pressure wave is generated due to a normal operation on the fluid transportation pipeline. The apparatus includes: receiving module configured to receive a plurality of pressure signals from a plurality of sensors; location determining module configured to determine a location of a wave source of the negative pressure wave; time difference determining module configured to determine time differences produced by the negative pressure wave reaching the adjacent sensors based on the plurality of pressure signals; and wave velocity estimating module configured to estimate the wave velocities of the negative pressure wave in sensor segments.

According to yet another aspect of the present invention, there is provided an apparatus for estimating a wave velocity of negative pressure wave in a fluid transportation pipeline, wherein the negative pressure wave is generated due to leakage at the fluid transportation pipeline. The apparatus includes: receiving module configured to receive a plurality of pressure signals from a plurality of sensors; time difference determining module configured to determine time differences produced by the negative pressure wave reaching the adjacent sensors based on the received plurality of pressure signals; segment determining module configured to determine a wave source sensor segment where a wave source of the negative pressure wave is located; and wave velocity estimating module configured to estimate the wave velocities of the negative pressure wave in a non-wave source sensor segment and the wave source sensor segment.

BRIEF DESCRIPTION THE DRAWINGS

Through the more detailed description of some embodiments of the present invention in the accompanying drawings, the above and other objects, features and advantages of the present invention will become more apparent, wherein the same reference generally refers to the same components in the embodiments of the present disclosure.

Figure 4:
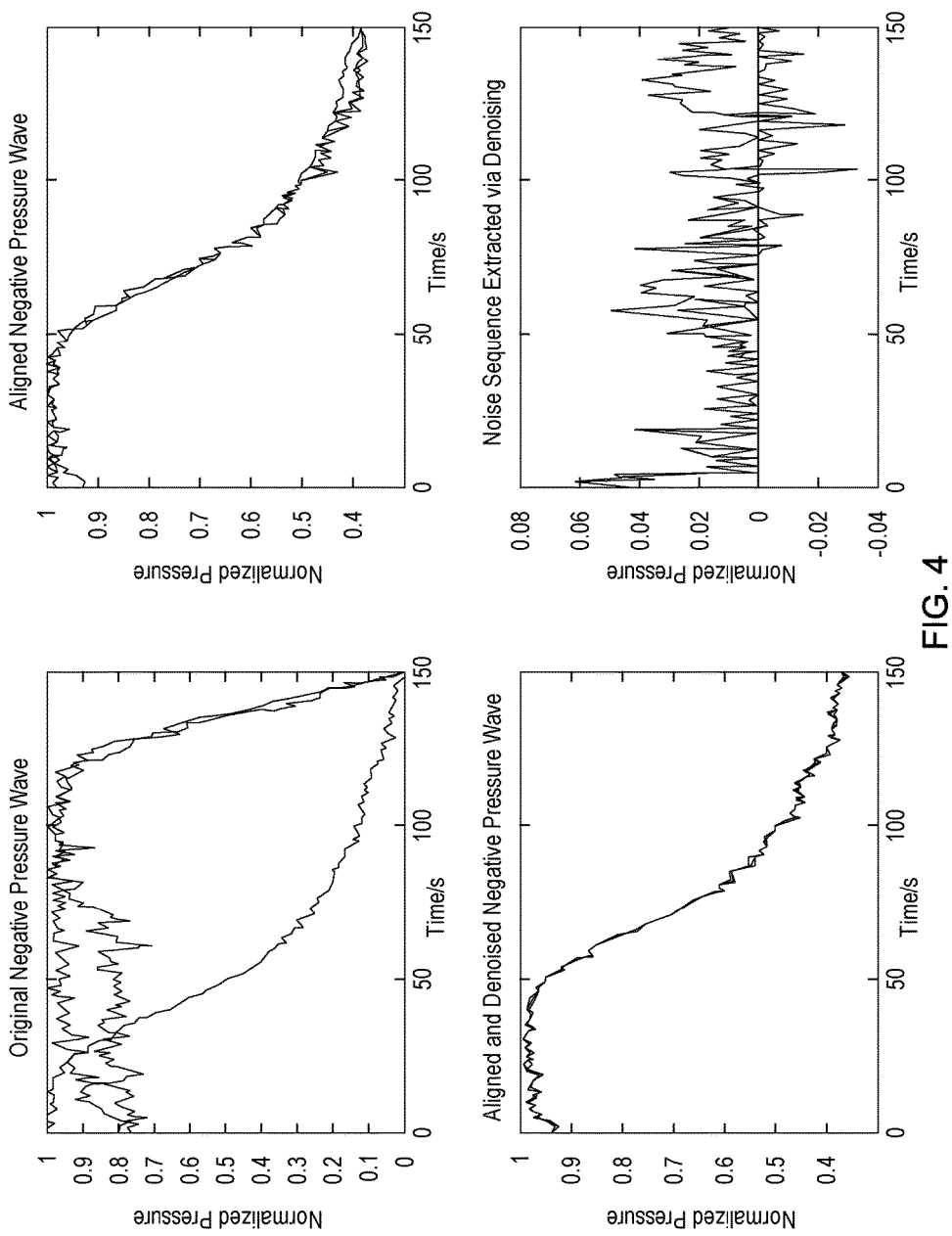

FIG. 4 illustratively shows wave form graphs of the negative pressure wave in the respective phases of a parallel alignment and denoising process.

Figure 3:
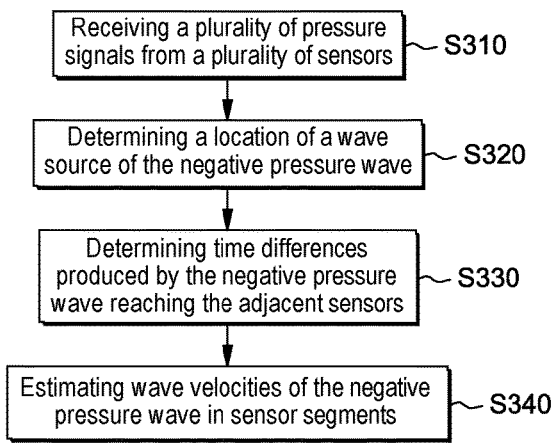
FIG. 3 is a flowchart of a method for estimating a wave velocity of negative pressure wave in a fluid transportation pipeline according to an embodiment of the invention.
Figure 5:
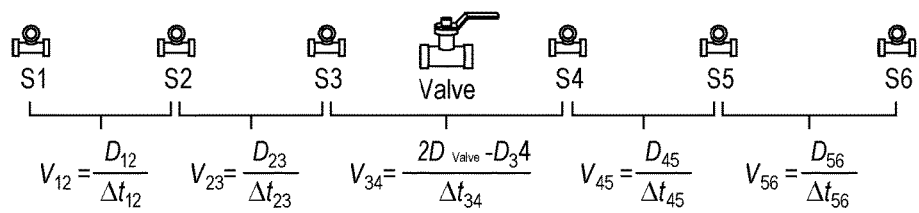

FIG. 5 is a diagram depicting an application example in which the method shown in FIG. 3 is implemented.

Figure 6:
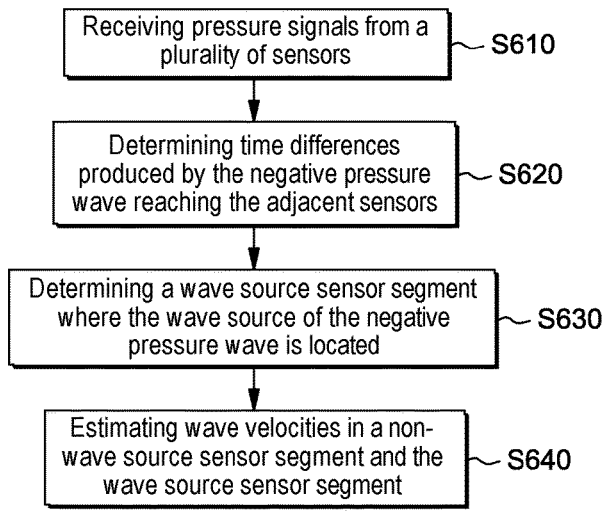

FIG. 6 is a flowchart of a method for estimating a wave velocity of negative pressure wave in a fluid transportation pipeline according to an embodiment of the invention.

Figure 7:
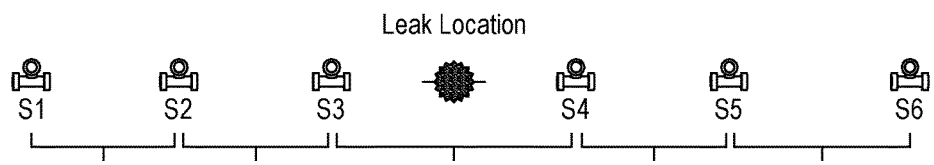

FIG. 7 is a diagram depicting an application example in which the method shown in FIG. 6 is implemented.

Figure 8:
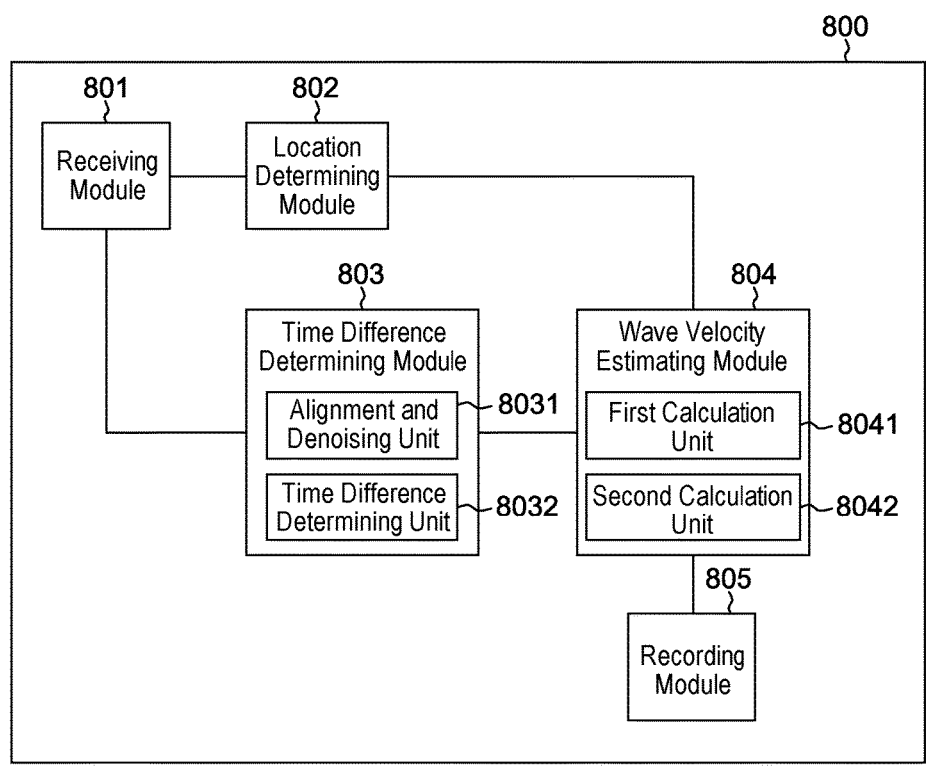

FIG. 8 is a schematic block diagram of the apparatus for estimating a wave velocity of negative pressure wave in a fluid transportation pipeline according to an embodiment of the invention.

Figure 9:
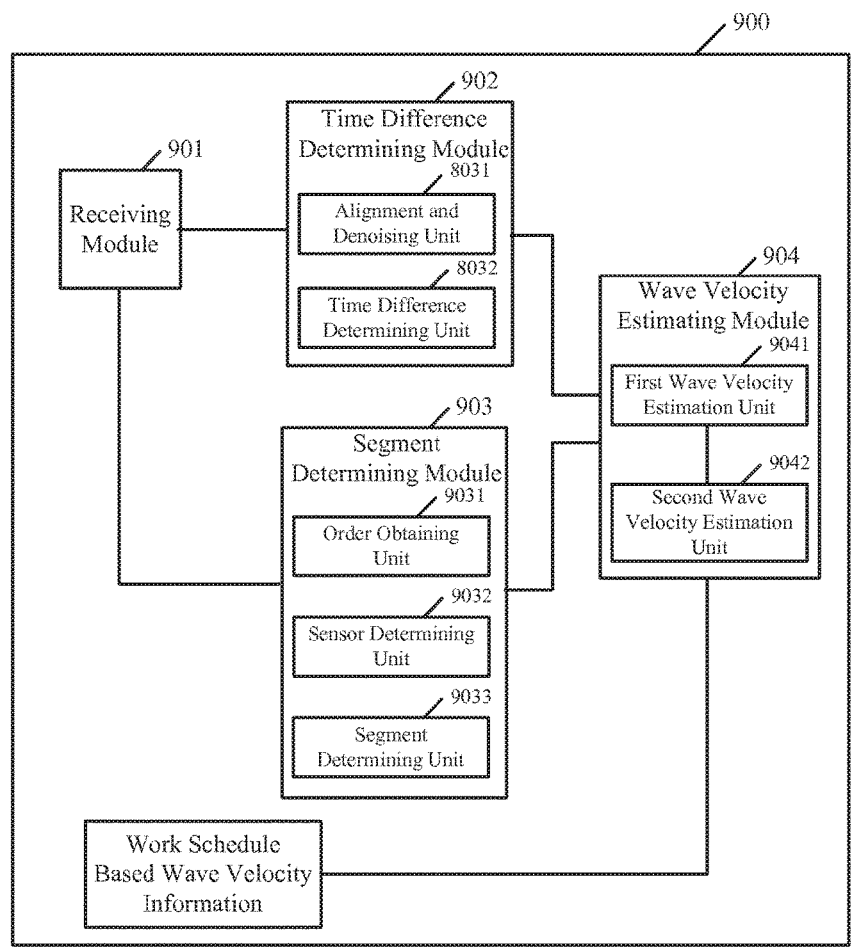

FIG. 9 is a schematic block diagram of the apparatus for estimating a wave velocity of negative pressure wave in a fluid transportation pipeline according to an embodiment of the invention.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon. Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
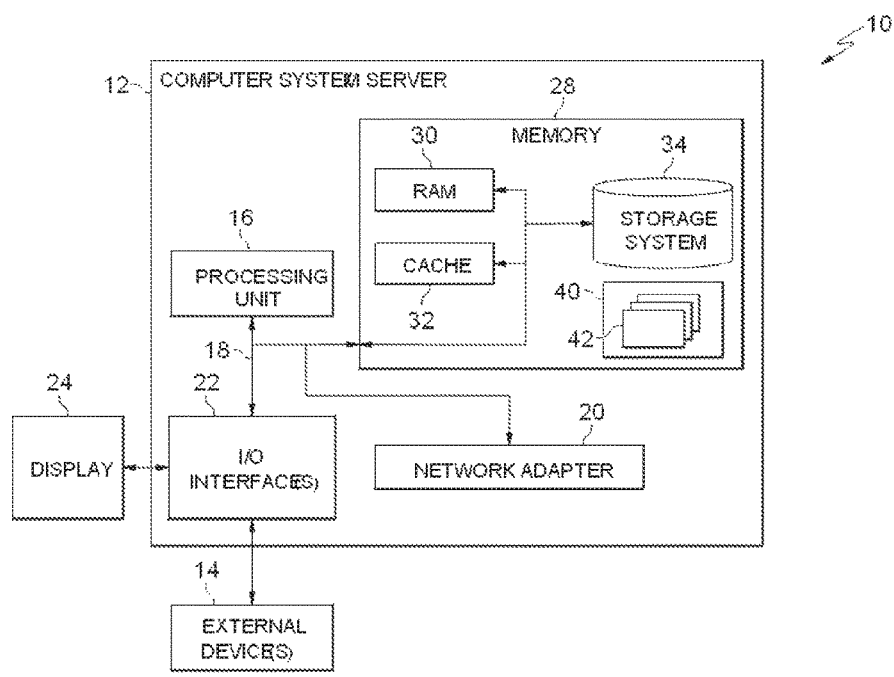
FIG. 1 shows a diagram of an exemplary computer system/server 10 which is applicable to implement the embodiments of the present invention.
Figure 2:
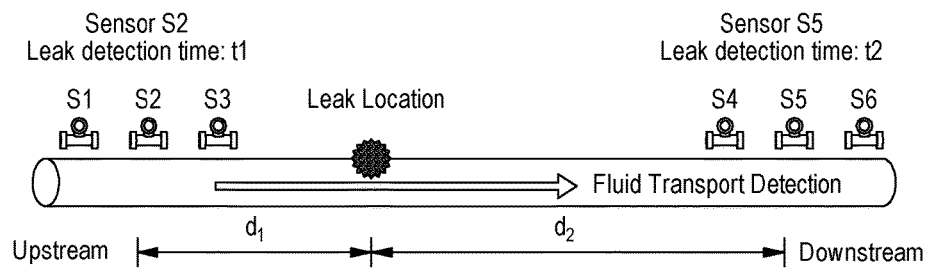
FIG. 2 is a diagram illustrating the existing acoustic pressure wave detection and locating method.

FIG. 1 shows a block diagram of an exemplary computer system/server 10 which is applicable to implement the embodiments of the present invention. The computer system/server 10 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28, by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

FIG. 3 is a flowchart of the method for estimating a wave velocity of negative pressure wave in a fluid transportation pipeline according to an embodiment of the invention. The embodiment will be described below in detail in conjunction with the accompany drawings.

The method according the present embodiment is applicable to the case where the negative pressure wave is generated by the normal operation on the fluid transportation pipeline. The normal operation on the fluid transportation pipeline can include, for example, opening or closing of a valve on the fluid transportation pipeline at a specified time, change in type of the fluid in the fluid transportation pipeline, pump startup or shutdown, air filling in or released from the fluid transportation pipeline, etc. These operations are conducted based on a working schedule of the fluid transportation pipeline. The so-called working schedule refers to a time table for scheduling the operations of each unit on the fluid transportation pipeline, which can include information such as when each valve is opened or closed, when a pump is started up or shut down etc.

As shown in FIG. 3, at step S310, a plurality of pressure signals is received from a plurality of sensors. After the negative pressure wave is generated, a plurality of sensors on the fluid transportation pipeline can detect the pressure signals of the negative pressure wave at different time.

Next, at step S320, a location of a wave source of the negative pressure wave is determined. As stated above, it is known that the negative pressure wave is generated due to a normal operation on the fluid transportation pipeline, and the normal operation is conducted in accordance with the working schedule of the fluid transportation pipeline. Therefore, based on the working schedule of the fluid transportation pipeline, it can be determined which unit on the fluid transportation pipeline is performing the operation and the time when the operation is performed, thereby further determining the location of the unit that is performing the operation as the location of the wave source of the negative pressure wave.

Then, at step S330, the time differences produced by the negative pressure wave reaching the adjacent sensors are determined based on the received pressure signals.

In this embodiment, in order to acquire the accurate time difference, a parallel alignment and denoising process is performed on the plurality of pressure signals, and then the differences between start times of the aligned pressure signals of the adjacent sensors are determined as the time differences produced by the negative pressure wave reaching the adjacent sensors.

The parallel alignment and denoising process can align the pressure signals and remove noise from the signals at the same time, to obtain the aligned pressure signals and the detached noise signals. The parallel alignment and denoising process will be described below by some detailed embodiments.

In one exemplary embodiment, a signal segment of each of the plurality of pressure signals is sampled with the same time length within a specified time period to form a sampling sequence. The specified time period is a time period containing occurrence time of the negative pressure wave. For each of the pressure signals, the start time for sampling can be same or different. Next, an objective function including an alignment index and a denoising index is minimized by using these sampling sequences, to obtain the minimum value of the objective function under the constraint of both alignment index and denoising index. Then, each pressure signal is sampled within the specified time period again to obtain the sampling sequence, wherein the sampling time of each pressure signal is different from the previous sampling time of the corresponding pressure signal. The objective function is minimized by using these sampling sequences. After the above sampling operation and minimization operation have been performed for multiple times, the minimum values of a plurality of the objective functions corresponding to the different sampling sequences can be acquired. Then the minimum values of these objective functions are compared with each other, and the sampling sequences corresponding to the minimum value of the minimum values of these objective functions are determined as the aligned sampling sequences, and the corresponding noise signals detached from these sampling sequences are also obtained. The time differences between the adjacent sensors can be obtained based on the aligned sampling sequences. Signal-to-noise ratio of the corresponding sensor can be evaluated based on the detached noise signal to acquire the noise level of the sensor. In this example embodiment, any state space search method can be used.

In another exemplary embodiment, a signal segment of each of the plurality of pressure signals is sampled with the same time length within a specified time period to form a sampling sequence. The specified time period is a time period containing the occurrence time of the negative pressure wave. For each of the pressure signals, the start time for sampling can be the same or different. Next, a plurality of the sampling sequences is formed into a sampling matrix, wherein each row of the sampling matrix is the sampling sequence for one pressure signal. Then, the sampling matrix is factorized into a first matrix and a second matrix, such that an order of the first matrix is less than a first specified value, a sparseness index of the second matrix is less than a second specified value, and a residual error between the sampling matrix and the first and second matrices is minimum. In this embodiment, the order of the first matrix being less than the first specified value can be considered as an alignment index, and the sparseness index of the second matrix being less than the second specified value can be considered as a denoising index, and the residual error between the sampling matrix and the first and second matrices can be considered as the objective function. Accordingly, the first matrix is the alignment matrix, and the second matrix is the noise matrix. The sparseness index can be, for example, an amount of the non-zero elements in a matrix, or any other index representing the sparseness. Then, each pressure signal is sampled within the specified time period again to obtain the sampling sequence, wherein the sampling time of each pressure signal is different from the previous sampling time of the corresponding pressure signal. Another sampling matrix is formed using the obtained sampling sequences and is factorized to obtain the alignment matrix, noise matrix and minimum value of the residual error. After the above sampling operation, forming operation and factorization operation have been performed for multiple times, the minimum values of the multiple residual errors and corresponding alignment matrix and noise matrix can be acquired. Then, the minimum values of these residual errors are compared with each other, and the sampling sequences in the sampling matrix corresponding to the minimum value of the minimum values of these residual errors are determined as the aligned sampling sequences. The time differences between the adjacent sensors can be obtained based on the aligned sampling sequences. The signal-to-noise ratio of the respective sensors can be evaluated based on the noise matrix to acquire the noise level of the respective sensors.

FIG. 4 illustratively shows the wave form graphs of the negative pressure wave in the respective phases of the parallel alignment and denoising process, wherein the top left graph shows a wave form graph of the original negative pressure wave detected by a plurality of sensors, the top right graph shows a wave form graph of the aligned negative pressure wave, the bottom left graph shows a wave form graph of the aligned and denoised negative pressure wave, and the bottom right graph shows a wave form graph of the noise extracted via the denoising. It can be seen that the good aligned signals and detached noise signals can be obtained through the parallel alignment and denoising process.

Then, at step S340, the wave velocities of the negative pressure wave in sensor segments are estimated. The sensors on the fluid transportation pipeline can divide the fluid transportation pipeline into a plurality of sensor segments. Based on the location of the wave source of the negative pressure wave determined at step S320, the wave source sensor segment where the wave source is located can be known, and the sensor segment where the wave source is not located is the non-wave source sensor segment.

In step S340, for each of at least one non-wave source sensor segment, the wave velocity of the negative pressure wave in the non-wave source sensor segment is calculated based on the difference of distance between two end sensors of the non-wave source sensor segment and the time difference produced by the negative pressure wave arriving at the two end sensors determined at step S330. Specifically, the wave velocity of the negative pressure wave in a non-wave source sensor segment can be equal to the difference of distance $D_{seg}$ between two end sensors of the segment divided by the time difference $\Delta t$ between the two end sensors, i.e. $V_{seg}=D_{seg}/\Delta t$. Next, for the wave source sensor segment, the wave velocity of the negative pressure wave in the wave source sensor segment is calculated based on the location of the wave source, the difference of distance between two end sensors of the wave source sensor segment and the time difference produced by the negative pressure wave arriving at the two end sensors. Specifically, the wave velocity of the negative pressure wave in the wave source sensor segment is calculated in accordance with the following equation (2):

$$V_{seg}=(2D_{wave\ source}-D_{seg})/\Delta t \qquad (2)$$

wherein $V_{seg}$ represents the wave velocity of the negative pressure wave in the wave source sensor segment, $D_{wave\ source}$ represents the location of the wave source (i.e. the distance from the wave source to the start point of the fluid transportation pipeline), $D_{seg}$ is the difference of distance of the wave source sensor segment, and $\Delta t$ represents the time difference.

Further, in this embodiment, the sensor segment where the wave source of the negative pressure wave is located, the wave velocities of the negative pressure wave in the respective sensor segments, and the type of the fluid transported in the fluid transportation pipeline can be further recorded as working schedule based wave velocity information of the fluid transportation pipeline. In addition, the temperature of fluid, the corresponding operation on the fluid transportation pipeline, the occurrence time of the operation, and the signal-to-noise ratio of the sensor can also be recorded in the working schedule based wave velocity information.

It can be seen from the above description that, the method for online determining wave velocity of negative pressure wave of the embodiment is capable of accurately determining wave source location where the negative pressure wave occurs based on a working schedule of fluid transportation pipeline, and obtaining time differences produced by the negative pressure wave arriving at the adjacent sensors through performing the parallel alignment and denoising process on pressure signals, thereby calculating wave velocities of negative pressure wave in the respective sensor segments. In addition, working schedule based wave velocity information can be used to estimate the wave velocity of the negative pressure wave when actual leakage occurs.

FIG. 5 is a diagram depicting an application example in which the method shown in FIG. 3 is implemented. In the example shown in FIG. 5, according to the topology structure of the fluid transportation pipeline, distance $D_{12}$, $D_{23}$, $D_{34}$, $D_{45}$, $D_{56}$ between sensors S1, S2, S3, S4, S5, S6 are known, and location $D_{valve}$ of a valve on the fluid transportation pipeline is also known. Assume that the valve between sensor S3 and S4 is opened, the negative pressure wave thus generated propagates upstream (along the direction of sensors S3, S2, S1) and downstream (along the direction of sensors S4, S5, S6) respectively, and sensors S1, S2, S3, S4, S5, S6 detect the pressure signals of the negative pressure wave at different time. The pressure signals detected by the sensors are processed with the parallel alignment and denoising process, and time differences $\Delta t_{12}$, $\Delta t_{23}$, $\Delta t_{34}$, $\Delta t_{45}$, $\Delta t_{56}$ produced by the negative pressure wave reaching the adjacent sensors are obtained based on the aligned pressure signals. Thus, for non-wave source sensor segments Seg12, Seg23, Seg45, Seg56, wave velocities of the negative pressure wave are $V_{12}=D_{12}/\Delta t_{12}$, $V_{23}=D_{23}/\Delta t_{23}$, $V_{45}=D_{45}/\Delta t_{45}$, $V_{56}=D_{56}/\Delta t_{56}$ respectively, and in wave source sensor segment Seg34, wave velocity of the negative pressure wave is $V_{34}=(2D_{valve}-D_{34})/\Delta t_{34}$. Then, the information, such as the wave source sensor segment, the wave velocities of the negative pressure wave in the respective sensor segments, the occurrence time of the negative pressure wave, the corresponding operations on the fluid transportation pipeline, the type of the fluid, the temperature of the fluid, SNRs of the sensors can be recorded. Each time when an operation is performed on the fluid transportation pipeline according to the working schedule, the wave velocities of the resulting negative pressure wave in the respective sensor segments will be calculated, and these wave velocities and relevant information will be recorded to form the working schedule based wave velocity information which is to be used in estimating the wave velocity of the negative pressure wave when a leak occurs.

FIG. 6 is a flowchart of the method for estimating a wave velocity of negative pressure wave in a fluid transportation pipeline according to an embodiment of the invention. The embodiment will be described below in detail in conjunction with the accompany drawings, wherein for the same parts as those in the above embodiment, their description will be properly omitted.

The method according to this embodiment is applicable to the negative pressure wave generated by the actual leakage at the fluid transportation pipeline.

As shown in FIG. 6, at step S610, a plurality of pressure signals is received from a plurality of sensors. As mentioned above, when a leak occurs at the fluid transportation pipeline, there will be a decline in pressure and the pressure decline propagates from the leak location both upstream and downstream, thus forming the negative pressure wave. A plurality of sensors on the fluid transportation pipeline can detect the pressure signals of the negative pressure wave at different times.

Next, at step S620, time differences produced by the negative pressure wave reaching the adjacent sensors are determined based on the received pressure signals. In order to acquire the accurate time difference, the parallel alignment and denoising process is performed on the plurality of pressure signals, and then the differences between start times of the aligned pressure signals of the adjacent sensors are determined as the time differences produced by the negative pressure wave reaching the adjacent sensors.

The parallel alignment and denoising process is the process of aligning, filtering, and denoising the pressure signals at the same time, to obtain the aligned pressure signals and the detached noise signals. The implementation of the parallel alignment and denoising process has been described in detail in the previous embodiment, and its description will be omitted here.

Then, at step S630, the wave source sensor segment where the wave source of the negative pressure wave is located is determined. In this step, an order that the negative pressure wave arrives at the respective sensors is obtained. Indeed, when determining the time differences produced by the negative pressure wave reaching the adjacent sensors in step S620, the order that the negative pressure wave arrives at the respective sensors can be determined. Then, a sensor at which the negative pressure wave arrives first is determined based on the determined order that the negative pressure wave arrives at the respective sensors, and the sensor segment having the previous sensor and the next sensor to the sensor at which the negative pressure wave arrives first as the end points is determined as the wave source sensor segment.

In the example of FIG. 5, assume that a leak occurs between sensors S3 and S4, in the upstream direction, the negative pressure wave arrives at the sensors in the order of S3, S2, S1, and in the downstream direction, the negative pressure wave arrives at the sensors in the order of S4, S5, S6. For sensors S3 and S4, in the case that the negative pressure wave arrives at sensor S3 prior to sensor S4, sensor S3 is considered as a reference, and sensor segment Seg24 (=Seg23+Seg34) having sensors S2 and S4 as the end points is determined as the wave source sensor segment. This determination is based on the facts: 1) the time when sensor S6 detects the negative pressure wave is later than sensor S5, so it can be determined that the wave source of the negative pressure wave is at the upstream of sensor S5 or between sensors S5 and S6 and closer to sensor S5; the time when sensor S5 detects the negative pressure wave is later than sensor S4, so it can be determined that the wave source of the negative pressure wave is at the upstream of sensor S4 or between sensors S4 and S5 and closer to sensor S4; thus, it can be determined that the wave source of the negative pressure wave is at the upstream of sensor S5; 2) the time when sensor S4 detects the negative pressure wave is later than sensor S3, so it can be determined that the wave source of the negative pressure wave is at the upstream of sensor S3 or between sensors S3 and S4 and closer to sensor S3; thus, it can be further determined that the wave source of the negative pressure wave is at the upstream of sensor S4; 3) the time when sensor S3 detects the negative pressure wave is earlier than sensor S2, so it can be determined that the wave source of the negative pressure wave is at the downstream of sensor S3 or between sensors S2 and S3 and closer to sensor S3; the time when sensor S2 detects the negative pressure wave is earlier than sensor S1, so it can be determined that the wave source of the negative pressure wave is at the downstream of sensor S2 or between sensors S1 and S2 and closer to sensor S2; thus, it can be determined that the wave source of the negative pressure wave is at the downstream of sensor S2; therefore, it can be determined that the wave source of the negative pressure wave is between the downstream of sensor S2 and the upstream of sensor S4, that is, between sensor segment Seg24.

In the case that the negative pressure wave arrives at sensor S4 prior to sensor S3, sensor S4 can be considered as a reference, and sensor segment Seg35(=Seg34+Seg45) having sensors S3 and S5 as the end points is determined as the wave source sensor segment. This determination is based on the facts: 1) the time when sensor S6 detects the negative pressure wave is later than sensor S5, so it can be determined that the wave source of the negative pressure wave is at the upstream of sensor S5 or between sensors S5 and S6 and closer to sensor S5; the time when sensor S5 detects the negative pressure wave is later than sensor S4, it can be determined that the wave source of the negative pressure wave is at the upstream of sensor S4 or between sensors S4 and S5 and closer to sensor S4; thus, it can be determined that the wave source of the negative pressure wave is at the upstream of sensor S5; 2) the time when sensor S2 detects the negative pressure wave is earlier than sensor S1, it can be determined that the wave source of the negative pressure wave is at the downstream of sensor S2 or between sensors S1 and S2 and closer to sensor S2; the time when sensor S3 detects the negative pressure wave is earlier than sensor S2, it can be determined that the wave source of the negative pressure wave is at the downstream of sensor S3 or between sensors S2 and S3 and closer to sensor S3; thus, it can be determined that the wave source of the negative pressure wave is at the downstream of sensor S2; 3) the time when sensor S4 detects the negative pressure wave is earlier than sensor S3, it can be determined that the wave source of the negative pressure wave is at the downstream of sensor S4 or between sensors S3 and S4 and closer to sensor S4; thus, it can be further determined that the wave source of the negative pressure wave is at the downstream of sensor S3; therefore, it can be determined that the wave source of the negative pressure wave is between sensors S3 and S5, that is, between sensor segment Seg35.

It can be seen that no matter which of sensors S3 and S4 that the negative pressure wave reaches firstly, the determined wave source sensor segment will contain the location where the leak actually occurs.

Then, at step S640, the wave velocities of the negative pressure wave in the non-wave source sensor segments and the wave source sensor segment are estimated.

For the wave velocity of the negative pressure wave in the non-wave source sensor segment, as stated above, when the distance of the non-wave source sensor segment and the time difference produced by the negative pressure wave arriving at the end sensors are obtained, the wave velocity of the negative pressure wave in the non-wave source sensor segment can be equal to the difference of distance between the two end sensors of the segment divided by the time difference between these two end sensors, that is, $V_{seg}=D_{seg}/\Delta t$.

For the wave velocity of the negative pressure wave in the wave source sensor segment, the velocity can be estimated based on the pre-recorded working schedule based wave velocity information of the fluid transportation pipeline and the calculated wave velocities of the negative pressure wave in the non-wave source sensor segments. The working schedule based wave velocity information of the fluid transportation pipeline can be acquired through the method as shown in FIG. 3.

In one embodiment, firstly, based on the type of the fluid transported in the fluid transportation pipeline, one or more information entries containing the same type of fluid are searched in the working schedule based wave velocity information to form first candidate wave velocity information. Next, based on the wave source sensor segment determined at step S630, an information entry in which a sensor segment where the wave source is located is the wave source sensor segment is searched in the first candidate wave velocity information to form second candidate wave velocity information. As mentioned above, the wave source sensor segment determined at step S630 actually contains two sensor segments, therefore, all the information entries including the sensor segments in the wave source sensor segment will be searched to form the second candidate wave velocity information. Then, based on the calculated wave velocities of the negative pressure wave in the non-wave source sensor segments, an information entry including the wave velocities closest to the wave velocities of the negative pressure wave in the non-wave source sensor segments is searched in the second candidate wave velocity information as matching wave velocity information, and the wave velocity of the wave source sensor segment can be obtained from the matching wave velocity information. For example, the wave velocity of the wave source sensor segment can be an average value of the wave velocities of the two sensor segments contained in the wave source sensor segment.

In another embodiment, firstly, based on the wave source sensor segment determined at step S630, an information entry in which a sensor segment where the wave source is located is the wave source sensor segment is searched in the working schedule based wave velocity information. Since the wave source sensor segment determined at step S630 actually contains two sensor segments, all the information entries including these two sensor segments will be searched. Then, the wave velocity of the negative pressure wave in the wave source sensor segment is calculated regressively by using the searched information entries. Specifically, a relation between the wave velocity in the wave source sensor segment and the wave velocities in other sensor segments can be established, then the relation is trained with one or more searched information entries to determine coefficients of terms in the relation. Then, based on the calculated wave velocities of the negative pressure wave in the non-wave source sensor segments, the wave velocity of the negative pressure wave in the wave source sensor segment is calculated by using the relation. In this embodiment, the regressive calculation of the wave velocity of the wave source sensor segment can be implemented with an online Support Vector Machine.

It can be seen from the above description that the method for estimating a wave velocity of negative pressure wave in a fluid transportation pipeline of the present embodiment can estimate the wave velocity of the negative pressure wave caused by the leakage with the working schedule based wave velocity information, and therefore, it is capable of estimating the wave velocity of negative pressure wave more accurately.

FIG. 7 is a diagram depicting an exemplary application in which the method shown in FIG. 6 is implemented. In the example shown in FIG. 7, according to the topology structure of the fluid transportation pipeline, distance $D_{12}$, $D_{23}$, $D_{34}$, $D_{45}$, $D_{56}$ between sensors S1, S2, S3, S4, S5, S6 are known. Assume that a leak occurs between sensors S3 and S4 and is closer to sensor S3, the negative pressure wave thus generated propagates upstream (along the direction of sensors S3, S2, S1) and downstream (along the direction of sensors S4, S5, S6) respectively, and sensors S1, S2, S3, S4, S5, S6 detect the pressure signals of negative pressure wave at different time. The pressure signals detected by the sensors are processed with the parallel alignment and denoising process, and time differences $\Delta t_{12}$, $\Delta t_{23}$, $\Delta t_{34}$, $\Delta t_{45}$, $\Delta t_{56}$ produced by the negative pressure wave arriving at the adjacent sensors are obtained based on the aligned pressure signals. Then, based on the order that the negative pressure wave arrives at the respective sensors, it is determined that the wave source sensor segment where the wave source of the negative pressure wave is located is Seg24. For non-wave source sensor segments Seg12, Seg45, Seg56, wave velocities of the negative pressure wave are $V_{12}=D_{12}/\Delta t_{12}$, $V_{45}=D_{45}/\Delta t_{45}$, $V_{56}=D_{56}/\Delta t_{56}$ respectively. For wave source sensor segment Seg24, wave velocity $V_{24}$ in wave source sensor segment Seg24 can be estimated by the matching or regression method based on the pre-recorded working schedule based wave velocity information.

FIG. 8 is a schematic block diagram of the apparatus of estimating a wave velocity of negative pressure wave in a fluid transportation pipeline according to an embodiment of the invention. The embodiment will be described below in detail in conjunction with the accompany drawings, wherein for the same parts as those in the above embodiments, their description will be properly omitted.

Apparatus 800, according to an embodiment is applicable to the negative pressure wave generated by a normal operation on the fluid transportation pipeline.

As shown in FIG. 8, apparatus 800, according to an embodiment includes: a receiving module 801 configured to receive a plurality of pressure signals from a plurality of sensors; a location determining module 802 configured to determine a location of a wave source of the negative pressure wave; a time difference determining module 803 configured to determine time differences produced by the negative pressure wave reaching the adjacent sensors based on the plurality of pressure signals received by receiving module 801; and a wave velocity estimating module 804 configured to estimate the wave velocities of the negative pressure wave in sensor segments.

In apparatus 800, when the negative pressure wave is generated due to a normal operation on the fluid transportation pipeline, receiving module 801 receives a plurality of pressure signals of the negative pressure waves from a plurality of sensors. Then location determining module 802 can determine the location of the component currently performing the operation of the fluid transportation pipeline as the location of the wave source of the generated negative pressure wave, based on the working schedule of the fluid transportation pipeline.

Then in time difference determining module 803, an alignment and denoising unit 8031 performs the parallel alignment and denoising process on the received pressure signals, and a time difference determining unit 8032 determines the differences between start times of the aligned pressure signals of the adjacent sensors as the time differences produced by the negative pressure wave reaching the adjacent sensors.

In one embodiment, in alignment and denoising unit 8031, a sampling unit can sample a signal segment of each of the received pressure signals with same time length within a specified time period to form a sampling sequence, wherein for each pressure signal, the start time of the sampling can be same or different. Next, a minimization unit can minimize an objective function including an alignment index and a denoising index using a plurality of the sampling sequences sampled by the sampling unit, to obtain the minimum value of the objective function under constraint of both alignment index and denoising index. Then, the sampling unit can sample each pressure signal within the specified time period again to obtain another sampling sequence, wherein the sampling time of each pressure signal is different from the previous sampling time. And the minimization unit minimizes the objective function again by using these sampling sequences. After the sampling unit and the minimization unit perform the above sampling and minimization operations for multiple times, the minimum values of a plurality of objective functions corresponding to the different sampling sequences can be acquired. Then, a determining unit can determine the sampling sequences corresponding to the minimum value of the minimum values of the multiple objective functions as the aligned sampling sequences. Then time difference determining unit 8032 can determine the differences between the start times of the aligned pressure signals of the adjacent sensors as the time differences.

In another embodiment, in alignment and denoising unit 8031, a sampling unit can sample a signal segment of each of the received pressure signals with the same time length within a specified time period to form a sampling sequence. Then a forming unit forms a plurality of the sampling sequences into a sampling matrix, wherein each row of the sampling matrix is one of the sampling sequences. Then, a factorization unit factorizes the sampling matrix into a first matrix and a second matrix, such that an order of the first matrix is less than a first specified value, a sparseness index of the second matrix is less than a second specified value, and a residual error between the sampling matrix and the first and second matrices is minimum. In this embodiment, the sparseness index can be the amount of the non-zero elements in a matrix, or any other index representing the sparseness. The sampling unit can sample each pressure signal within the specified time period for multiple times to acquire the sampling sequences, wherein the start time of the sampling of each pressure signal can be different from the previous start time. Then, the forming unit forms a plurality of the sampling sequences sampled each time into a sampling matrix, which is factorized by the factorization unit to obtain the minimum value of the residual error of the respective sampling matrices. Then, a determining unit determines the sampling sequences in the sampling matrix corresponding to the minimum value of the minimized residual errors as the aligned sampling sequences. Then, time difference determining unit 8032 can determine the differences between the start times of the aligned pressure signals of the adjacent sensors as the time differences.

The time differences produced by the negative pressure wave arriving at the adjacent sensors determined in time difference determining module 803 and the location of the wave source of the negative pressure wave determined in location determining module 802 can be provided to wave velocity estimating module 804. In wave velocity estimating module 804, a first calculation unit 8041 calculates, for each of at least one non-wave source sensor segment where the wave source of the negative pressure wave is not located, the wave velocity of the negative pressure wave in the non-wave source sensor segment based on the difference of distance between two end sensors of the non-wave source sensor segment and the time difference produced by the negative pressure wave arriving at the two end sensors. In first calculation unit 8041, the wave velocity of the negative pressure wave in the non-wave source sensor segment can be equal to the difference of distance $D_{seg}$ between two end sensors of the segment divided by the time difference $\Delta t$ between the two end sensors, that is, $V_{seg}=D_{seg}/\Delta t$. A second calculation unit 8042 calculates, for the wave source sensor segment where the wave source of the negative pressure wave is located, the wave velocity of the negative pressure wave in the wave source sensor segment based on the location of the wave source, the difference of distance between two end sensors of the wave source sensor segment and the time difference produced by the negative pressure wave arriving at the two end sensors. Second calculation unit 8042 can calculate the wave velocity of the negative pressure wave in the wave source sensor segment in accordance with the above equation (2).

Further, apparatus 800, according to an embodiment also includes a recording module 805 configured to record the sensor segment where the wave source of the negative pressure wave is located, the wave velocities of the negative pressure wave in the respective sensor segments and the type of the fluid transported in the fluid transportation pipeline as information entries in the working schedule based wave velocity information of the fluid transportation pipeline. In addition, recording module 805 can also record the temperature of the fluid, the operation on the fluid transportation pipeline, the occurrence time of the operation and the signal-to-noise ratios of the sensors in the working schedule based wave velocity information.

It should be noted that apparatus 800 according to an embodiment is operable to implement a method for estimating a wave velocity of negative pressure wave in a fluid transportation pipeline shown in FIG. 3.

FIG. 9 is a schematic block diagram of an apparatus for estimating a wave velocity of negative pressure wave in a fluid transportation pipeline according to an embodiment of the invention. The embodiment will be described below in detail in conjunction with the accompany drawings, wherein for the same parts as those of the above embodiments, their description will be properly omitted.

Apparatus 900, according to an embodiment is applicable to the negative pressure wave generated by leakage at the fluid transportation pipeline.

As shown in FIG. 9, apparatus 900, according to an embodiment can include: a receiving module 901 configured to receive a plurality of pressure signals from a plurality of sensors; a time difference determining module 902 configured to determine time differences produced by the negative pressure wave reaching the adjacent sensors based on the received pressure signals; a segment determining module 903 configured to determine a wave source sensor segment where the wave source of the negative pressure wave is located; and a wave velocity estimating module 904 configured to estimate the wave velocities of the negative pressure wave in a non-wave source sensor segment and the wave source sensor segment.

In apparatus 900, according to an embodiment, when a leak occurs at the fluid transportation pipeline, a plurality of the sensors on the fluid transportation pipeline will detect the generated pressure signals of the negative pressure wave at different time, receiving module 901 can receive a plurality of pressure signals from the plurality of sensors.

Then in time difference determining module 902, an alignment and denoising unit 9021 performs a parallel alignment and denoising process on the received pressure signals, and a time difference determining unit 9022 determines the differences between start times of the aligned pressure signals of the adjacent sensors as the time differences produced by the negative pressure wave reaching the adjacent sensors.

In one embodiment, in alignment and denoising unit 9021, a sampling unit can sample a signal segment of each of the pressure signals with the same time length within a specified time period to form a sampling sequence, wherein for each pressure signal, the start time of the sampling can be same or different. Next, a minimization unit can minimize an objective function including an alignment index and a denoising index using a plurality of the sampling sequences, to obtain the minimum value of the objective function under constraint of both the alignment index and the denoising index. The sampling unit and the minimization unit perform sampling and minimization operations on the received pressure signals for multiple times, to obtain the minimum values of a plurality of objective functions. Then, a determining unit can determine the sampling sequences corresponding to the minimum value of the minimum values of the multiple objective functions as the aligned sampling sequences.

In another embodiment, in alignment and denoising unit 9021, a sampling unit samples a signal segment of each of the plurality of pressure signals with the same time length within the specified time period to form a sampling sequence, wherein for each pressure signal, the start time of the sampling can be same or different. Next, a forming unit forms a plurality of the sampling sequences into a sampling matrix, wherein each row of the sampling matrix is one of the sampling sequences. Then, a factorization unit factorizes the sampling matrix into a first matrix and a second matrix, such that an order of the first matrix is less than a first specified value, a sparseness index of the second matrix is less than a second specified value, and a residual error between the sampling matrix and the first and second matrices is minimum. The sampling unit can sample each pressure signal for multiple times to acquire the sampling sequences, then, the forming unit forms a plurality of the sampling sequences sampled each time into a sampling matrix, which is factorized by the factorization unit to obtain the minimum values of the multiple residual errors. Then, a determining unit can determine the sampling sequences in the sampling matrix corresponding to the minimum value of the minimum values of the multiple residual errors as the aligned sampling sequences.

After the time differences produced by the negative pressure wave arriving at the adjacent sensors are determined, in segment determining module 903, an order obtaining unit 9031 can obtain an order that the negative pressure wave arrives at the respective sensors, then a sensor determining unit 9032 determines the sensor at which the negative pressure wave arrives first, and a segment determining unit 9033 determines the sensor segment having the previous sensor and the next sensor to the sensor at which the negative pressure wave arrives first as the end points as the wave source sensor segment.

Then, in wave velocity estimating module 904, a first wave velocity estimation unit 9041 calculates, for each of the non-wave source sensor segments, the wave velocity of the negative pressure wave in the non-wave source sensor segment based on the distance of the non-wave source sensor segment and the time difference produced by the negative pressure wave arriving at the end sensors of the non-wave source sensor segment, the wave velocity can be equal to the difference of distance between two end sensors of the segment divided by the time difference between the two end sensors, that is, $V_{seg}=D_{seg}/\Delta t$.

Then a second wave velocity estimation unit 9042 estimates the wave velocity of the negative pressure wave in the wave source sensor segment based on the pre-recorded working schedule based wave velocity information of the fluid transportation pipeline and the wave velocities of the negative pressure wave in the respective non-wave source sensor segments calculated by first wave velocity estimation unit 9041.

In an embodiment of second wave velocity estimation unit 9042, a first searching unit searches, based on the type of the fluid transported in the fluid transportation pipeline, one or more information entries including the same type of the fluid in the working schedule based wave velocity information to form first candidate wave velocity information. Then a second searching unit searches, based on the wave source sensor segment determined in segment determining module 903, an information entry in which the sensor segment where the wave source is located is the wave source sensor segment in the first candidate wave velocity information to form second candidate wave velocity information. A third searching unit searches, in the second candidate wave velocity information, the information entry including the wave velocities closest to the wave velocities of the negative pressure wave in the non-wave source sensor segments calculated in first wave velocity estimation unit 9041 as matching wave velocity information, and a wave velocity obtaining unit obtains the wave velocity of the wave source sensor segment from the matching wave velocity information.

In another embodiment of second wave velocity estimation unit 9042, a searching unit searches, based on the wave source sensor segment determined in segment determining module 903, an information entry in which the sensor segment where the wave source is located is the wave source sensor segment in the working schedule based wave velocity information, then a regression calculating unit calculates the wave velocity of the negative pressure wave in the wave source sensor segment regressively using the searched information entry. In this embodiment, the regression calculating unit can utilize an online Support Vector Machine.

It should be noted that, apparatus 900, according to an embodiment, is operable to implement the method for estimating a wave velocity of negative pressure wave in a fluid transportation pipeline shown in FIG. 6.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for servicing a fluid transportation pipeline, wherein a negative pressure wave is generated due to a normal operation on the fluid transportation pipeline, the method comprising:
   receiving, at a processor unit, a plurality of pressure signals from a plurality of sensors, wherein the transportation pipeline includes a plurality of sensor segments, each of which is disposed between corresponding two adjacent sensors of the plurality of sensors;
   determining, by said processor unit, a location of a wave source of the negative pressure wave;
   determining, by said processor unit, at least one non-wave source sensor segment of the plurality of sensor segments based on the determined location of the wave source, wherein the at least one non-wave source sensor segment is a sensor segment where the wave source is not located;

determining, by said processor unit, a wave source sensor segment of the plurality of sensor segments based on the determined location of the wave source, wherein the one wave source sensor segment is a sensor segment where the wave source is located;

determining, by said processor unit, time differences produced by the negative pressure wave reaching the adjacent sensors, based on the plurality of pressure signals; and estimating, by said processor unit, the wave velocities of the negative pressure wave in the at least one non-wave source sensor segment and the wave source sensor segment, based on the determined time differences, and determining by said processor unit, the location of the unit that is performing the operation as the location of the wave source of the negative pressure wave using said estimated negative pressure wave velocities and a working schedule of said operating unit.

2. The method according to claim 1, wherein determining a location of a wave source of the negative pressure wave comprises:

determining a location of a component currently performing an operation of the fluid transportation pipeline as the location of the wave source of the negative pressure wave based on a working schedule of the fluid transportation pipeline.

3. The method according to claim 1, wherein determining time differences produced by the negative pressure wave reaching the adjacent sensors comprises:

sampling a signal segment of each of the plurality of pressure signals with a same time length within a specified time period to form a sampling sequence;

minimizing an objective function including an alignment index and a denoising index using a plurality of the sampling sequences;

repeating the above sampling operation and minimization operation for multiple times; and determining the sampling sequences corresponding to a minimum value of values of the minimized objective functions.

4. The method according to claim 1, wherein determining time differences produced by the negative pressure wave reaching the adjacent sensors comprises:

sampling a signal segment of each of the plurality of pressure signals with a same time length within a specified period of time to form a sampling sequence;

forming a plurality of the sampling sequences into a sampling matrix, wherein each row of the sampling matrix is one of the plurality of the sampling sequences;

factorizing the sampling matrix into a first matrix and a second matrix, such that an order of the first matrix is less than a first specified value, a sparseness index of the second matrix is less than a second specified value, and a residual error between the sampling matrix and the first and second matrices is minimum;

repeating the above sampling operation, forming operation, and factorizing operation for multiple times; and determining the sampling sequences in the sampling matrix corresponding to a minimum residual error of the multiple minimized residual errors.

5. The method according to claim 1, wherein estimating the wave velocities of the negative pressure wave in the at least one non-wave source sensor segment and the wave source sensor segment comprises:

calculating, for each of the at least one non-wave source sensor segment, the wave velocity of the negative pressure wave in the non-wave source sensor segment based on a difference of distance between a first pair of sensors corresponding to boundaries of the non-wave source sensor segment and a time difference produced by the negative pressure wave reaching the first pair of sensors; and calculating, for the wave source sensor segment, the wave velocity of the negative pressure wave in the wave source sensor segment based on the location of the wave source, a difference of distance between a second pair of sensors corresponding to boundaries of the wave source sensor segment and the time difference produced by the negative pressure wave reaching the second pair of sensors.

6. The method according to claim 1, further comprising:

recording the sensor segment where the wave source of the negative pressure wave is located, the wave velocities of the negative pressure wave in the respective sensor segments, and a type of fluid transported in the fluid transportation pipeline.

7. A method for servicing a fluid transportation pipeline, wherein a negative pressure wave is generated due to leakage at the fluid transportation pipeline, the method comprising:

receiving, at a processor unit, a plurality of pressure signals from a plurality of sensors, wherein the transportation pipeline includes a plurality of sensor segments, each of which is disposed between corresponding two adjacent sensors of the plurality of sensors;

determining, by said processor unit, time differences produced by the negative pressure wave reaching the adjacent sensors, based on the received plurality of pressure signals;

determining, by said processor unit, a wave source sensor segment of the plurality of sensor segments based on the determined time differences, wherein the wave source sensor segment is a sensor segment where a wave source of the negative pressure wave is located;

estimating, by said processor unit, the wave velocities of the negative pressure wave in one or more non-wave source sensor segments and the wave source sensor segment, based on the determined time differences, wherein the one or more non-wave source sensor segments are sensor segments other than the wave source sensor segment of the plurality of sensor segments; and determining, by said processor unit, a location of said leakage at the fluid transportation pipeline using said estimated negative pressure wave velocities.

8. The method according to claim 7, wherein determining time differences produced by the negative pressure wave reaching the adjacent sensors comprises:

sampling a signal segment of each of the plurality of pressure signals with a same time length within a specified time period to form a sampling sequence;

minimizing an objective function including an alignment index and a denoising index using a plurality of the sampling sequences;

repeating the above sampling operation and minimization operation for multiple times; and determining the sampling sequences corresponding to a minimum value of values of the multiple minimized objective functions.

9. The method according to claim 7, wherein determining time differences produced by the negative pressure wave reaching the adjacent sensors comprises:

sampling a signal segment of each of the plurality of pressure signals with a same time length within a specified time period to form a sampling sequence;

forming a plurality of the sampling sequences into a sampling matrix, wherein each row of the sampling matrix is one of the plurality of the sampling sequences;

factorizing the sampling matrix into a first matrix and a second matrix, such that an order of the first matrix is less than a first specified value, a sparseness index of the second matrix is less than a second specified value, and a residual error between the sampling matrix and the first and second matrices is minimum;

repeating the above sampling operation, forming operation, and factorizing operation for multiple times; and determining the sampling sequences in the sampling matrix corresponding to a minimum residual error of the multiple minimized residual errors.

10. The method according to claim 7, wherein determining a wave source sensor segment comprises:

obtaining an order that the negative pressure wave arrives at the respective sensors;

determining a first sensor at which the negative pressure wave arrives first; and determining a sensor segment disposed between two sensors positioned adjacently at both sides with respect to the first sensor.

11. The method according to claim 7, wherein estimating the wave velocities of the negative pressure wave in one or more non-wave source sensor segments and the wave source sensor segment comprises:

calculating, for each of the one or more non-wave source sensor segments, the wave velocity of the negative pressure wave in the non-wave source sensor segment based on a difference of distance between a pair of sensors corresponding to boundaries of the non-wave source sensor segment and a time difference produced by the negative pressure wave arriving at the two end sensors; and estimating the wave velocity of the negative pressure wave in the wave source sensor segment based on a pre-recorded working schedule based wave velocity information of the fluid transportation pipeline and the calculated wave velocities of the negative pressure wave in the respective non-wave source sensor segments.

12. The method according to claim 11, wherein estimating the wave velocity of the negative pressure wave in the wave source sensor segment comprises:

searching, based on a type of fluid transported in the fluid transportation pipeline, an information entry including the same type of fluid in the working schedule based wave velocity information to form a first candidate wave velocity information;

searching, based on the wave source sensor segment, an information entry in which the sensor segment where the wave source is located is the wave source sensor segment in the first candidate wave velocity information to form a second candidate wave velocity information;

searching, in the second candidate wave velocity information, an information entry including the wave velocities closest to the calculated wave velocities of the negative pressure wave in the non-wave source sensor segments as matching wave velocity information; and obtaining the wave velocity in the wave source sensor segment from the matching wave velocity information.

13. The method according to claim 11, wherein estimating the wave velocity of the negative pressure wave in the wave source sensor segment comprises:

searching, based on the wave source sensor segment, an information entry in which the sensor segment where the wave source is located is the wave source sensor segment in the working schedule based wave velocity information; and calculating the wave velocity of the negative pressure wave in the wave source sensor segment regressively using the searched information entry.

14. An apparatus for servicing a fluid transportation pipeline, wherein a negative pressure wave is generated due to a normal operation on the fluid transportation pipeline, the apparatus comprising:

at least one memory element;

at least one processor coupled to the memory element; wherein the processor is configured to:

receive a plurality of pressure signals from a plurality of sensors, wherein the transportation pipeline includes a plurality of sensor segments, each of which is disposed between corresponding two adjacent sensors of the plurality of sensors;

determine a location of a wave source of the negative pressure wave;

determine at least one non-wave source sensor segment of the plurality of sensor segments based on the determined location of the wave source, wherein the at least one non-wave source sensor segment is a sensor segment where the wave source is not located;

determine a wave source sensor segment of the plurality of sensor segments based on the determined location of the wave source, wherein the wave source sensor segment is a sensor segment where the wave source is located;

determine time differences produced by the negative pressure wave reaching adjacent sensors based on the plurality of pressure signals; and estimate the wave velocities of the negative pressure wave in the at least one non-wave source sensor segment and the wave source sensor segment, based on the determined time differences; and determine the location of the unit that is performing the operation as the location of the wave source of the negative pressure wave using said estimated negative pressure wave velocities and a working schedule of said operating unit.

15. The apparatus according to claim 14, wherein in determining a location of a wave source of the negative pressure wave, the processor is further configured to:

determine a location of a component currently performing an operation of the fluid transportation pipeline as the location of the wave source of the negative pressure wave based on a working schedule of the fluid transportation pipeline.

16. The apparatus according to claim 14, wherein in determining the time differences produced by the negative pressure wave reaching the adjacent sensors, the processor is further configured to execute steps:

sample a signal segment of each of the plurality of pressure signals with a same time length within a specified time period to form a sampling sequence;

minimize an objective function including an alignment index and a denoising index using a plurality of the sampling sequences; and determine the sampling sequences corresponding to a minimum value of values of the multiple minimized objective functions.

17. The apparatus according to claim 14, wherein in determining the time differences produced by the negative pressure wave reaching the adjacent sensors, the processor is further configured to execute steps:

sample a signal segment of each of the plurality of pressure signals with a same time length within a specified time period to form a sampling sequence;

form a plurality of the sampling sequences into a sampling matrix, wherein each row of the sampling matrix is one of the plurality of the sampling sequences;

factorize the sampling matrix into a first matrix and a second matrix, such that an order of the first matrix is less than a first specified value, a sparseness index of the second matrix is less than a second specified value, and a residual error between the sampling matrix and the first and second matrices is minimum; and determine the sampling sequences in the sampling matrix corresponding to a minimum residual error of the multiple minimized residual errors.

18. An apparatus for servicing a fluid transportation pipeline, wherein a negative pressure wave is generated due to leakage at the fluid transportation pipeline, the apparatus comprising:

at least one memory element;

at least one processor coupled to the memory element;

wherein the processor is configured to:

receive a plurality of pressure signals from a plurality of sensors, wherein the transportation pipeline including a plurality of sensor segments, each of which is disposed between corresponding two adjacent sensors of the plurality of sensors;

determine time differences produced by the negative pressure wave reaching the adjacent sensors based on the received pressure signals;

determine a wave source sensor segment of the plurality of sensor segments based on the determined time differences, wherein the wave source sensor segment is a sensor segment where a wave source of the negative pressure wave is located; and estimate the wave velocities of the negative pressure wave in one or more non-wave source sensor segments and the wave source sensor segment, based on the determined time differences; and determine a location of said leakage at the fluid transportation pipeline using said estimated negative pressure wave velocities.

19. The apparatus according to claim 18, wherein to determine the time differences, said processor is further configured to:

sample a signal segment of each of the plurality of pressure signals with a same time length within a specified time period to form a sampling sequence;

to minimize an objective function including an alignment index and a denoising index using a plurality of the sampling sequences; and to determine the sampling sequences corresponding to a minimum value of values of the multiple minimized objective functions.

20. The apparatus according to claim 18, wherein to determine a wave source sensor segment of the plurality, said processor is further configured to:

obtain an order that the negative pressure wave arrives at the respective sensors;

determine a first sensor at which the negative pressure wave arrives first; and determine a sensor segment disposed between two sensors positioned adjacently at both sides with respect to the first sensor.

* * * * *